Figure 1:
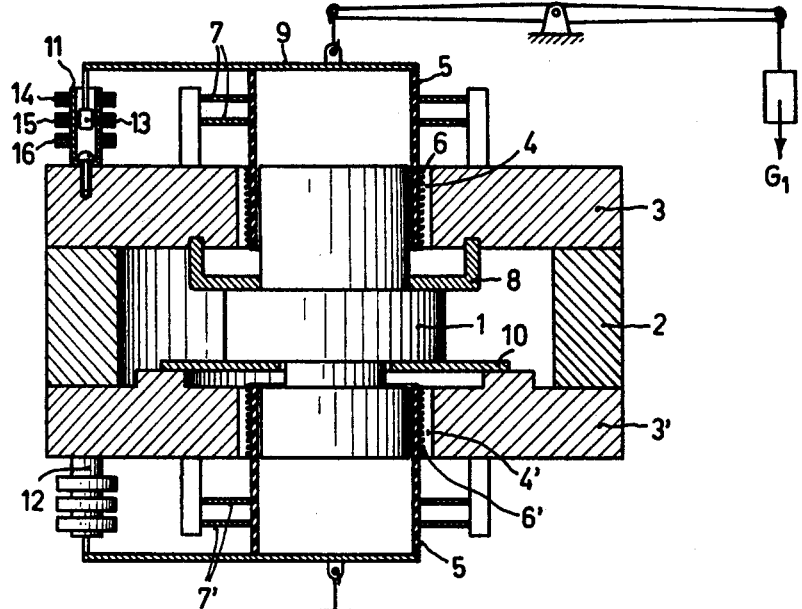

June 1, 1965  J. VAN WILGEN  3,186,504
WEIGHING APPARATUS

Filed Aug. 31, 1962  2 Sheets-Sheet 1

INVENTOR
JACOB VAN WILGEN.

BY
Frank P. Dufair
AGENT

United States Patent Office 3,186,504
Patented June 1, 1965

3,186,504
WEIGHING APPARATUS
Jacob van Wilgen, Emmasingel, Eindhoven, Netherlands, assignor to North American Philips Company, Inc., New York, N.Y., a corporation of Delaware
Filed Aug. 31, 1962, Ser. No. 220,651
Claims priority, application Netherlands, Sept. 8, 1961, 269,071
21 Claims. (Cl. 177—210)

The invention relates to a weighing apparatus in which the weight of the article to be weighed is compared with the force produced by an electric current. In such apparatus the current usually flows through a coil arranged in an air gap of a magnetic circuit so that an electrodynamic force is exerted on the coil. The coil has a zero position and after being loaded by the weight shows a deflection, after which the current is adjusted so that the coil returns to the zero position under the influence of the force produced by the current. Thus the strength of the current is a measure of the weight.

It is an object of the present invention to provide an apparatus of the type described above wherein a digital indication of the weight may be simply obtained.

The invention consists in that the current is taken from a generator producing identical current pulses, means being provided to vary the number of pulses produced during a particular time interval, the said number being determined by a counter.

Only the direct-current component of the pulses determines the force which is exerted upon the coil and acts in one particular direction. It is proportional to the number of pulses.

In a preferred embodiment of the invention, the pulses are preferably applied to the coil in periodically produced trains. If required, the pulses are applied thereto through a smoothing device having an integrating action which produces a mean current. A number of pulses of each train are suppressed in accordance with the weight of the article to be weighed, whereas the remaining number is counted by the counter. The suppression may be effected with the aid of a control voltage derived from a known zero-position indicator. In a further embodiment, the pulses may be applied in regular sequence and their repetition frequency may be varied in accordance with the weight of the article. The number of pulses applied within a certain time interval are then measured by the counter.

The magnetism of the circuit may vary with time or with temperature with a resulting decrease in the accuracy of the balance. To eliminate this disadvantage, according to the invention an automatic correcting device may be provided which comprises a second coil which is arranged in an air gap of the same magnetic circuit and is displaced under the influence of a known weight. The second coil is returned to the zero position by a regular train of pulses having the same variation in time as the first, a zero position indicator producing a control voltage for this coil which so controls the two trains of pulses that the variation with time of all the pulses is so controlled that the second coil is returned to a pre-determined position, preferably to the zero position. The above described apparatus in effect provides a system which maintains a constant ratio between the currents flowing in the two coils for any given weight to be measured, i.e. the apparatus inherently measures the ratio of the currents flowing in these coils.

Figure 2:
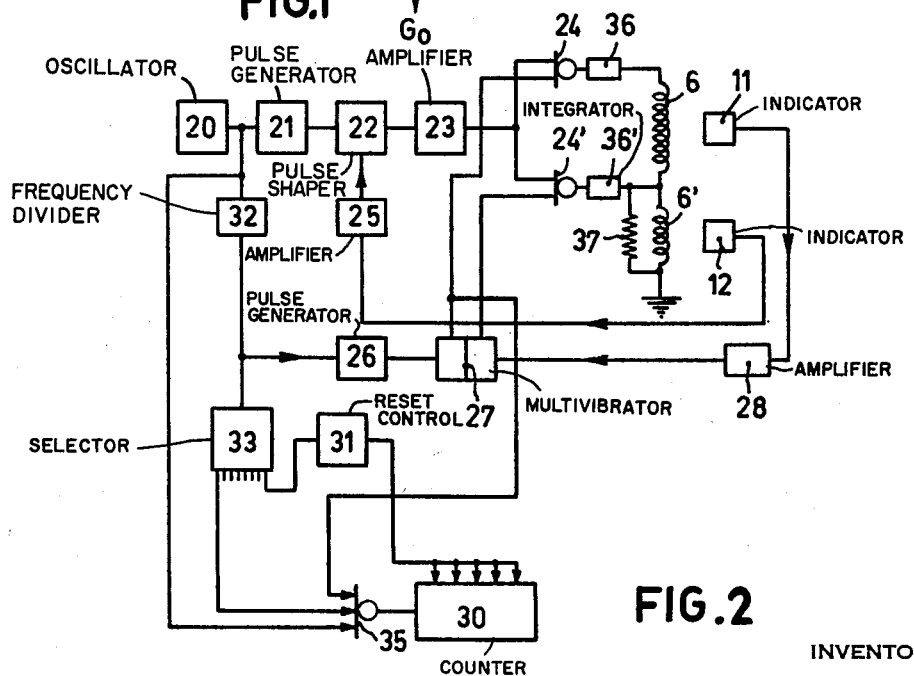
Figure 3:
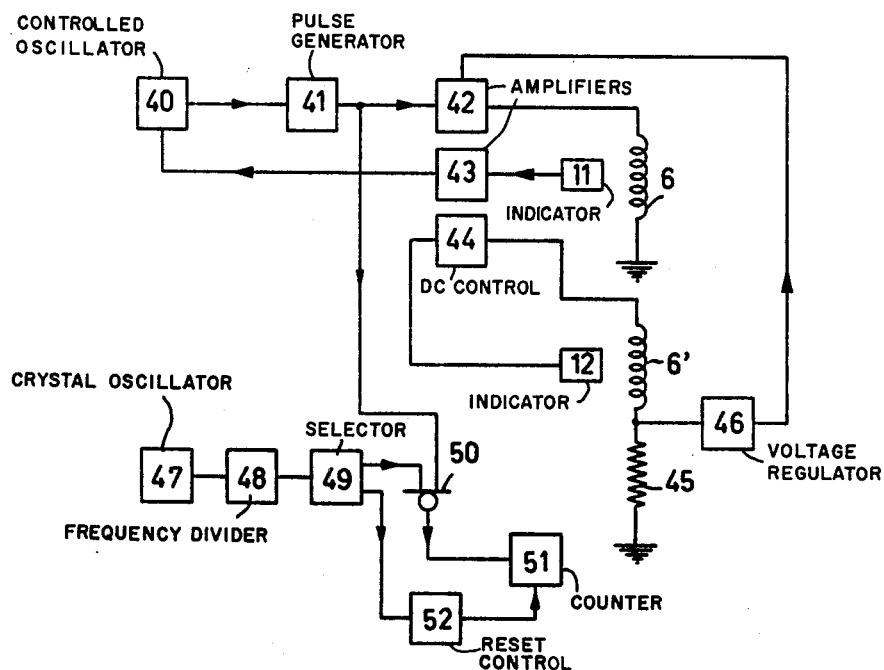

The invention will now be described more fully with reference to the drawing, wherein:

FIGURE 1 shows the magnet system and the coils and FIGURES 2 and 3 show two different embodiments of the circuit diagram.

The magnetic circuit in the system shown in FIGURE 1 comprises an annular permanent magnet 2, a cylindrical core 1 and two flanges 3 and 3' joined by a non-magnetic connecting piece 8 to form an integral mechanical structure. The flanges are provided with circular apertures in which the ends of the core are disposed so as to produce two cylindrical air gaps 4 and 4' having a radial field. Coils 6 and 6', provided on formers 5 and 5', respectively, are axially displaceable in the air gaps. The coils perform different functions. The upper coil 6 may be referred to as the main coil and the lower coil 6' may be referred to as the auxiliary coil. The field in which the latter is arranged being appreciably weaker than that in which the former is placed. This may be ensured in known manner with the aid of a magnetic shunt 10 arranged parallel to the air gap of the second coil. A weight $G_1$ to be measured acts upon the upper coil and a known calibrating weight $G_0$ acts upon the lower coil. It is assumed that the natural mechanical vibration periods of the coil systems are large compared with the periods of the pulse trains applied to them.

Thus when the values of the mean currents traversing the coils 6 and 6' are such that the forces exerted on the coils by the magnetic field are balanced by the weights $G_1$ and $G_0$, the coils are in their zero positions. These zero positions are determined by suspension springs 7 and 7' and are indicated by zero-position indicators 11 and 12.

Each zero-position indicator 11 may comprise a ferromagnetic core 13 adapted to move within a cylinder on which three coils 14, 15 and 16 are provided. The core is attached to an arm 9 rigidly secured to the coil former 5. An alternating current producing a magnetic alternating field is passed through the middle coil 15. When the core is in the center position, equal alternating voltages are induced in the coils 14 and 16. The coils 14 and 16 are oppositely connected in an electric circuit so that in the zero position of the member 13 the total voltage induced in the circuit is equal to zero whereas for a small deviation from zero, a difference voltage is produced the phase of which determines the direction of the deviation. This arrangement is known and the difference voltage may be converted in known manner into a D.C. control voltage the polarity of which corresponds with the direction of the deviation. The zero indicator 12 is identical with the indicator 11 and the associated core is attached to an arm 9' rigidly connected to a coil former 5'.

If no current is supplied to the coils 6 and 6', the core of the zero-position indicator 11 is moved upwards under the action of the weight $G_1$ and the core of the zero-position indicator 12 is moved downwards by the calibrating weight $G_0$. The coils 6 and 6' are returned to the zero position with the aid of direct currents produced in a manner described hereinafter with reference to FIGURE 2.

In the circuit diagram of FIGURE 2, an oscillator 20 produces a voltage having a frequency of, for example, 100 kc./s. In a device 21 this voltage is converted into a periodic pulse train of, for example, positive polarity. The pulses are applied to a device 22 in which they are given the desired shape with the aid of a control voltage. After being amplified in an amplifier 23, the pulses are applied to two electronic switching arrangements 24 and 24' (gate circuits) by which they are transmitted either to the series combination of the coils 6 and 6' or to the coil 6' only. The amplifier 23 is designed so as to produce pulses of constant current strength irrespective of the impedance by which it is terminated.

The switching arrangements 24 and 24' are controlled by a multivibrator 27 which is always either in one condition or in the other so that always either the gate 24 or the gate 24' is open to allow the current pulses from the amplifier 23 to pass. Thus the coil 6 is traversed by the current pulses periodically only but the coil 6' continuously. The strength of the mean current flowing through the coil 6' depends upon the ratio between the impedance of this coil and the value of a resistor 37 which is connected in parallel with the coil and the effect of which will be explained hereinafter. Integrating networks 36 and 36' suppressing the alternating current components are preferably connected between the switching arrangements and the coils.

The zero-position indicator 11 produces a control voltage which is amplified in an amplifier 28 and then fed to the multivibrator 27. The zero-position indicator 12 produces a control voltage which after being amplified in a device 25 acts as a control voltage for the device 22. In the latter device the duration and/or the amplitude of the pulses are adjusted so that the direct-current component of the current flowing through the coil 6' is just capable of cancelling the influence of the calibrating weight $G_0$ upon the arm 9'. However, since the coil 6' is arranged in a field substantially weaker than that in which the coil 6 is placed, the same current if it were to flow in its entirety through the coil 6 would be able to compensate for a much greater weight in this coil. Part of the current supplied by the device 23 is absorbed by the parallel resistor 37 and hence does not flow through the coil 6' so that the maximum weight to be compensated by the coil 6 is adjustable with the aid of the said resistor.

If the weight $G_1$ is less than this maximum weight, the direct-current component of the pulses supplied by the device 23, if these pulses were also active in the coil in their entirety, would be too strong to compensate for the action of the weight on the arm 9. Hence to achieve correct compensation part of the pulses flowing through the coil 6 are periodically suppressed. This is effected with the aid of the gate circuits 24 and 24' which each have two inputs and only allow a signal to pass if a signal of the correct strength and polarity appears at both inputs.

The monostable multivibrator 27 is controlled in the following manner. The voltage from the oscillator 20 is applied to a frequency divider 32 controlling a device 26 in which a train of pulses having a repetition frequency of, for example, 10 c./s. is produced. The monostable multivibrator 27 is triggered by these pulses 10 times per second and after each pulse assumes a condition such that the gate circuit 24 is opened and the gate circuit 24' is closed. The time during which the multivibrator 27 remains in this position is determined by the control voltage derived from the zero-position indicator 11. After this time the multivibrator 27 always is restored to the rest condition in which the gate circuit 24 is closed and the gate circuit 24' is opened so that the pulses are applied only to the coil 6'.

Thus the zero-position indicator 11 so determines the part of the pulses applied to the coil 6 that the weight $G_1$ is compensated. When the control voltage is greatly amplified a very small deviation from the zero position is sufficient to produce a large variation of the time during which the pulses are applied to the coil 6. This variation is always such that the deviation of the zero-position indicator is counteracted. The process is repeated every 100 msecs. owing to the fact that the pulses produced by the device 26 are also applied to the device 27. Consequently a state of equilibrium is established in which always the number of pulses applied to the coil 6 is such as just to compensate for the influence of the weight $G_1$.

Hence the number of pulses traversing the coil 6 in each period of 100 msecs. is increased with increase in the weight $G_1$ and has to be proportional to this weight. The pulses of each train are also applied to a counter 30 which in each second counts one train and for the remaining period of time indicates the value counted.

Just before the new train is counted the counter is re-set with the aid of a device 31. This is effected as follows:

The pulses produced by the frequency divider 32 are also applied to a selector 33. This is an electronic ten-step switch having ten outputs, the output voltage being shifted one step after each pulse applied to the input. Thus a voltage appears at each output for 100 msecs. The output voltage of the first output acts upon a gate circuit 35 to which are also applied the pulses from the oscillator 20 and from that output of the multivibrator 27 which also acts upon the gate circuit 24. Hence pulses are only applied to the counter 30 connected to the gate circuit 35 if:

(a) A voltage is set up at the first output of the selector 33, that is to say, during a single cycle of 100 msecs. in each series of 10 cycles;

(b) The multivibrator 27 is in the operating condition.

Consequently, during one of the ten cycles only the pulses applied to the coil 6 are counted. Since the number of these pulses is proportional to the weight $G_1$ the reading of the counter indicates the weight after calibration and correct adjustment of the entire apparatus.

During the succeeding 9 cycles of 100 msecs. each, the counter continues to indicate the same number. At the beginning of the tenth cycle the counter is re-set to zero by the device 31. After the tenth cycle a voltage again appears at the first output and the entire counting period comprising ten cycles is repeated.

Since not only the periods of the multivibrator 27 but also the periods of the selector 33 are derived from the oscillator 20, the accuracy of the entire apparatus is independent of the frequency stability of the oscillator 20.

A second embodiment of the electronic system is shown in FIGURE 3. An oscillator 40 is influenced by a control voltage determining the frequency. The oscillator is connected to a device 41 in which the voltage is converted into pulses of a particular very constant duration. The pulses are applied to the coil 6 through an amplifier 42 in which their amplitude is controlled and, if required, through an integrating device.

The control voltage produced by the zero position indicator 11 is amplified in a device 43 and then fed to the oscillator 40. The arrangement is such that a slight variation of the control voltage produces a large frequency variation of the oscillator voltage.

A device 44 supplies a direct current flowing through the series combination of the coil 6' and a resistor 45. The device 44 is controlled by the control voltage derived from the zero position indicator 12 in a manner such that the current flowing through the coil 6' is adjusted to a value at which the influence of the calibrating weight $G_0$ is just counteracted. Thus across the resistor 45 a voltage is set up which varies directly as the current flowing through the coil. This voltage is used as a reference for the voltage regulator 46, the output voltage of which feeds the device 42.

If now the field strength in the air gap 4' is decreased due to a decrease in the magnetism of a permanent magnet, the device 44 has to pass a larger current through the coil 6' if the weight $G_0$ is still to be compensated. As a result the voltage across the resistor 45 and hence the supply voltage of the device 42 are proportionally increased so that the said device applies pulses of greater current strength to the coil 6 and hence the reduction of the magnetism is just compensated.

In this circuit arrangement, the frequency of the oscillator 40 varies directly as the value of the weight $G_1$. The voltage at this frequency is applied through a gate circuit 50 to a counter 51. To the gate circuit 50 is also applied a voltage derived from the first output of a selector 49 the operation of which is the same as that of the selector 33 of FIGURE 1. The selector is controlled through a frequency divider 48 by a crystal oscillator 47 which again produces a voltage having a frequency of 100 kc./s. The selector again takes steps of 100 msec. During the time in which a voltage is set up at the first output, the gate circuit 50 is opened and pulses from the device 41 are applied to the counter 51. Since this time is exactly 100 msec. the reading of the counter at the end of this cycle is equal to the frequency of the oscillator divided by 10. With correct adjustment of the entire apparatus this number indicates the weight $G_1$. As soon as a voltage appears at the output 10 of the selector, the counter is restored to the zero condition by a restoring device 52 and a new counting cycle may start.

What is claimed is:

1. Apparatus for measuring a force comprising means for producing a magnetic field, a current-carrying coil located within said magnetic field, means responsive to said force for causing relative movement between said magnetic field producing means and said coil proportional to the magnitude of said force, means for producing a plurality of current pulses for said coil in a given time interval, means responsive to the relative movement of said field producing means and said coil for controlling the number of current pulses supplied to said coil in said given time interval, and means for producing an indicating signal as determined by the number of said pulses supplied to said coil in said time interval.

2. Apparatus for weighing an article comprising means for producing a magnetic field, a current-carrying coil having a reference position and movably mounted within said magnetic field, means responsive to the weight of said article for causing movement of said coil from said reference position by an amount determined by the weight of said article, means for producing a plurality of current pulses for said coil in a given time interval, means responsive to the movement of said coil from said reference position for controlling the number of current pulses supplied to said coil in said given time interval thereby providing a force tending to restore said coil to said reference position by the interaction of the field produced by said current-carrying coil and said magnetic field, and means for producing an indicating signal as determined by the number of said pulses supplied to said coil in said time interval.

3. Apparatus for weighing an article comprising magnetic circuit means having a cylindrically shaped air gap in which a radial magnetic field is produced, a cylindrically shaped current-carrying coil located within said air gap, means for mounting said coil and said magnetic circuit means for relative displacement, means responsive to the weight of said article for causing relative displacement between said magnetic circuit means and said coil by an amount determined by the weight of said article, means for producing a plurality of current pulses for said coil in a given time interval, means responsive to the relative displacement of said magnetic circuit means and said coil for controlling the number of current pulses supplied to said coil in said given time interval, and means for producing an indicating signal as determined by the number of said pulses supplied to said coil in said time interval.

4. Apparatus for measuring a force comprising means for producing a magnetic field, a current-carrying coil located within said magnetic field, means responsive to said force for causing relative movement between said magnetic field producing means and said coil by an amount determined by the magnitude of said force, means for generating a predetermined number of current pulses within a given time period, means for applying said pulses to said coil, means responsive to the relative movement of said field producing means and said coil for producing a control signal for blocking the passage of a number of said pulses to said coil in said timed period in accordance with the magnitude of said force, and means for producing an indicating signal as determined by the number of said pulses applied to said coil in said time period.

5. Apparatus for weighing an article comprising a magnetic circuit means having an air gap in which a magnetic field is produced, a current-carrying coil having a reference position and movably mounted within said air gap, means responsive to the weight of said article for displacing said coil through a distance proportional to said weight, means for generating a predetermined number of current pulses within a given time interval, control means responsive to the displacement of said coil from said reference position for deriving a control signal proportional thereto, circuit means responsive to said control signal for regulating the number of current pulses supplied from said pulse generating means to said coil in said given time interval whereby a restoring force is developed tending to return said coil to said reference position by the interaction of the coil field and said magnetic field, and means for counting the number of said pulses supplied to said coil in said time interval.

6. Apparatus for weighing an article comprising magnetic circuit means, having an air gap in which a magnetic field is produced, a current carrying coil having a reference position and movably mounted within said air gap, means responsive to the weight of said article for displacing said coil through a distance proportional to said weight, means for generating a predetermined number of current pulses within a given time interval, gate means connected between said pulse generating means and said coil, control means responsive to the displacement of said coil from said reference position for deriving a control signal proportional thereto, means responsive to said control signal having two states at least one of which is stable, said latter means supplying a gate control signal to open said gate means for a period of time less than said given time interval thereby to pass a number of current pulses dependent upon the weight of said article, said current pulses producing a field in said coil in said given time interval which interacts with said magnetic field to produce a force tending to restore said coil to the reference position, and means for counting the number of said pulses supplied to said coil in said time interval.

7. Apparatus as described in claim 6 further comprising second gate means connected between said pulse generating means and said counting means, and means for applying said gate control signal to said second gate means thereby to open said second gate means to pass a number of current pulses to said counting means equal to the number of pulses applied to said coil in said given time interval.

8. Apparatus for measuring a force comprising magnetic circuit means having first and second air gaps in which magnetic fields are produced, first and second current-carrying coils movably mounted within said first and second air gaps, respectively, means for coupling said force to said first coil to cause a displacement thereof proportional to said froce, means for applying a known force to said second coil to cause a proportional displacement thereof, means for supplying a plurality of current pulses to said first and second coils in a given time interval, means responsive to the displacement of said first coil for controlling the number of current pulses supplied to said first coil in said given time interval, means responsive to the displacement of said second coil for deriving a control signal for regulating the direct current component of the current pulses supplied to said first coil, and means for producing an indicating signal as determined by the number of said pulses supplied to said first coil in said given time interval.

9. Apparatus for measuring a force comprising magnetic circuit means having first and second air gaps in which magnetic fields are produced, first and second current-carrying coils movably mounted within said first and second air gaps, respectively, each of said coils having a reference position relative to said magnetic circuit means, means for coupling said force to said first coil to cause a displacement thereof from its reference position by an amount determined by the magnitude of said force, means for applying a known force to said second coil to cause a proportional displacement thereof from its reference position, means for supplying a plurality of current pulses to said first coil in a given time interval, means responsive to the displacement of said first coil from its reference position for controlling the number of current pulses supplied to said first coil in said given time interval thereby providing a force tending to restore said coil to its reference position, means for supplying a unidirectional current to said second coil which produces a force tending to restore said coil to its reference position, means responsive to the displacement of said second coil from its reference position for deriving a control signal for regulating the direct current component of the current pulses supplied to said first coil, and means for producing an indicating signal as determined by the number of said pulses supplied to said first coil in said given time interval.

10. Apparatus as described in claim 9 wherein said magnetic circuit means comprises an annular magnetic core having first and second axially aligned cylindrical shaped air gaps and wherein said first and second coils are mounted on cylindrical shaped coil formers, and means for mounting said coil formers of axial displacement within said air gaps.

11. Apparatus as described in claim 9 further comprising means for adjusting the magnetic field strength in said second air gap to a value below that of said first air gap comprising magnetic means shunting said second air gap.

12. Apparatus as described in claim 8 further comprising first and second integrating circuit means connected in series between said means for supplying current pulses and said first and second coils, respectively.

13. Apparatus for weighing an article comprising magnetic circuit means having first and second air gaps in which magnetic fields are produced, first and second current-carrying coils movably mounted within said first and second air gaps, respectively, each of said coils having a reference position relative to said magnetic circuit means, means responsive to the weight of said article for causing a displacement of said first coil from its reference position by an amount proportional to said weight, means for applying a known weight to said second coil to cause a proportional displacement thereof from its reference position, means for generating a plurality of current pulses within a given time interval for supplying said first and second coils, means responsive to the displacement of said first coil from its reference position for deriving a control signal proportional thereto, control means responsive to said control signal for regulating the number of current pulses supplied to said first coil within said given time interval thereby providing a restoring force tending to return said first coil to its reference position, means responsive to the displacement of said second coil from its reference position for deriving a second control signal for regulating the direct current component of the current pulses supplied to said first and second coils, means for coupling said pulse generating means to said second coil thereby to supply said current pulses to said second coil so as to produce a restoring force tending to return said second coil to its reference position, and means for counting the number of said pulses supplied to said first coil in said given time interval.

14. Apparatus as described in claim 13 wherein said control means comprises first and second gate means serially connected between said pulse generating means and said first and second coils, respectively.

15. Apparatus for weighing an article comprising magnetic circuit means having first and second air gaps in which magnetic fields are produced, first and second current-carrying coils movably mounted within said first and second air gaps, respectively, each of said coils having a reference position relative to said magnetic circuit means, means responsive to the weight of said article for causing a displacement of said first coil from its reference position by an amount proportional to said weight, means for applying a known weight to said second coil to cause a proportional displacement thereof from its reference position, means for supplying unidirectional currents to said first and second coils, means for regulating said unidirectional currents supplied to said first and second coils thereby to return said first and second coils to their respective reference positions, and means responsive to the ratio of the currents supplied to said first and second coils for indicating the weight of said article to be weighed.

16. Apparatus for measuring a force comprising means for producing a magnetic field, a current-carrying coil located within said magnetic field, means for mounting said coil and said magnetic field producing means for relative displacement, means responsive to said force for causing relative displacement between said magnetic field producing means and said coil proportional to said force, means for generating and supplying a plurality of current pulses to said coil in a given time interval, means responsive to the relative displacement of said field producing means and said coil for varying the pulse repetition rate of said pulse generating means, and means for counting the number of pulses supplied to said coil in said given time interval.

17. Apparatus for weighing an article comprising magnetic circuit means having first and second air gaps in which magnetic fields are produced, first and second current-carrying coils movably mounted within said first and second air gaps, respectively, means responsive to the weight of said article for causing a displacement of said first coil proportional thereto, means for applying a known weight to said second coil to cause a proportional displacement thereof, means for generating a plurality of current pulses within a given time interval, means for supplying said current pulses to said first coil, means responsive to the relative displacement of said first coil from said magnetic circuit means for deriving a control voltage for varying the pulse repetition rate of said pulse generating means, means responsive to the displacement of said second coil for deriving a control voltage for regulating the direct current component of the current pulses supplied to said first coil, and means for counting the number of pulses supplied to said first coil in said given time interval.

18. Apparatus for weighing an article comprising magnetic circuit means having first and second air gaps in which magnetic fields are produced, first and second current-carrying coils movably mounted within said first and second air gaps, respectively, each of said coils having a reference position relative to said magnetic circuit means, means responsive to the weight of said article for causing a displacement of said first coil from its reference position by an amount proportional to said weight, means for applying a known weight to said second coil to cause a proportional displacement thereof from its reference position, means for generating a plurality of current pulses within a given time interval, means for supplying said current pulses to said first coil, means responsive to the relative displacement of said first coil from its reference position for deriving a control voltage for varying the pulse repetition rate of said pulse generating means, means for supplying a direct current to said second coil, means responsive to the displacement of said second coil from its reference position for deriving a control voltage for controlling the magnitude of said direct current supplied to said second coil so that a restoring force is produced which tends to return said second coil to its reference position, means responsive to the current flow in said second coil for deriving a control voltage for regulating the direct current component for the current pulses supplied to said first coil, and means for counting the number of pulses supplied to said first coil in said given time interval.

19. Apparatus as described in claim 14 wherein said first and second coils are serially connected between said first gate means and a point of reference potential and said second gate means is connected to the common junction of said first and second coils whereby pulses passed by said first gate means are applied to both of said coils and pulses passed by said second gate means are applied only to said second coil.

20. A condition responsive device comprising magnetic circuit means having an air gap and means for producing a magnetic field therein, a coil located in magnetic coupling relationship with said magnetic field, means for causing relative displacement between said coil and said magnetic circuit means as a function of the condition to which said device is responsive, means for producing a plurality of current pulses for said coil in a given time interval, a position sensitive transducer responsive to the relative displacement of said coil and magnetic circuit means for deriving a control signal, means responsive to said control signal for controlling the number of current pulses supplied to said coil in said given time interval whereby a restoring force is developed urging said coil and magnetic circuit means to a predetermined equilibrium position, and means for counting the number of said pulses supplied to said second coil in said given time interval.

21. Apparatus as described in claim 20 further comprising electro-mechanical transducer means magnetically coupled to said magnetic circuit means and responsive to a variation in the magnetic field intensity of said magnetic circuit means for deriving a second control signal for regulating the direct current component of the pulses supplied to said coil.

References Cited by the Examiner

UNITED STATES PATENTS

| | | | |
|---|---|---|---|
| 2,602,660 | 7/52 | Shannon | 177—210 |
| 2,914,310 | 11/59 | Bahrs | 177—210 |
| 2,940,747 | 6/60 | Eder et al. | 177—210 |
| 3,107,743 | 10/63 | Knobel | 177—229 X |
| 3,108,648 | 10/63 | Williams | 177—210 X |

FOREIGN PATENTS 105,798  11/38  Australia.

OTHER REFERENCES

Basic Telemetry Methods, Kamsler, Instruments and Control Systems (periodical), June 1961, pages 1068–1070.

LEO SMILOW, *Primary Examiner*.